(12) United States Patent
Nojek et al.

(10) Patent No.: US 10,324,005 B2
(45) Date of Patent: Jun. 18, 2019

(54) METHOD AND DEVICE FOR CHECKING THE TIRE MOUNTING ON A VEHICLE

(71) Applicant: Beissbarth GmbH, Munich (DE)

(72) Inventors: Klaudia Nojek, Hannover (DE); Marc Luther, Peine (DE)

(73) Assignee: Beissbarth GmbH, Munich (DE)

( * ) Notice: Subject to any disclaimer, the term of this patent is extended or adjusted under 35 U.S.C. 154(b) by 17 days.

(21) Appl. No.: 15/128,712

(22) PCT Filed: Mar. 5, 2015

(86) PCT No.: PCT/EP2015/054660
§ 371 (c)(1),
(2) Date: Sep. 23, 2016

(87) PCT Pub. No.: WO2015/144417
PCT Pub. Date: Oct. 1, 2015

(65) Prior Publication Data
US 2017/0122842 A1    May 4, 2017

(30) Foreign Application Priority Data
Mar. 25, 2014   (DE) .......................... 10 2014 205 515

(51) Int. Cl.
| | |
|---|---|
| *G06K 9/00* | (2006.01) |
| *G01M 17/02* | (2006.01) |
| *G06F 16/583* | (2019.01) |
| *G06T 7/00* | (2017.01) |
| *G06K 9/62* | (2006.01) |
| *H04N 5/76* | (2006.01) |

(52) U.S. Cl.
CPC ....... *G01M 17/027* (2013.01); *G06F 16/5838* (2019.01); *G06K 9/6201* (2013.01); *G06T 7/97* (2017.01); *H04N 5/76* (2013.01); *G06T 2207/30268* (2013.01)

(58) Field of Classification Search
CPC .. G01M 17/027; G06F 17/30256; H04N 5/76; G06K 9/6201; G06T 7/97; G06T 2207/30268; G01B 11/22
(Continued)

(56) References Cited

U.S. PATENT DOCUMENTS

| | | | |
|---|---|---|---|
| 6,069,966 A * | 5/2000 | Jones ..................... | G01B 11/22 382/100 |
| 7,352,881 B2 * | 4/2008 | Lestideau .......... | G06K 9/00228 348/169 |

(Continued)

FOREIGN PATENT DOCUMENTS

| | | |
|---|---|---|
| CN | 1916563 A | 2/2007 |
| CN | 103168219 A | 6/2013 |

(Continued)

OTHER PUBLICATIONS

International Search Report for PCT/EP2015/054660, dated May 22, 2015, 2 pages.

*Primary Examiner* — Sheela C Chawan
(74) *Attorney, Agent, or Firm* — Norton Rose Fulbright US LLP; Gerard A. Messina

(57) ABSTRACT

A device for checking the mounting of tires on a vehicle includes at least one image recording device that is configured for recording images of at least two tires mounted on the vehicle, the images each capturing at least one area of a tire, and at least one data processing device that is adapted for analyzing the recorded images to determine whether the tires have been correctly mounted on the vehicle.

6 Claims, 5 Drawing Sheets

(58) Field of Classification Search
USPC .......... 382/218, 100, 104; 701/16, 1, 23, 28,
701/400, 408, 514, 523, 469, 300, 301,
701/93, 96, 36, 49; 348/61, 143, 148,
348/207.99, 373, 180, 187, 188; 340/933,
340/937, 425.5, 438, 945; 180/9.5, 9.28,
180/9.3
See application file for complete search history.

(56) References Cited

U.S. PATENT DOCUMENTS

| | | | | |
|---|---|---|---|---|
| 7,382,913 | B2* | 6/2008 | Dorranc | G01B 11/2755 |
| | | | | 29/273 |
| 8,571,332 | B2* | 10/2013 | Kumar | G06K 9/6269 |
| | | | | 382/118 |
| 8,625,105 | B2* | 1/2014 | Pryce | G01B 11/245 |
| | | | | 356/601 |
| 8,705,803 | B2* | 4/2014 | Berger | B60C 11/00 |
| | | | | 382/107 |
| 8,737,747 | B2* | 5/2014 | Bulan | G01M 17/027 |
| | | | | 382/155 |
| 8,783,313 | B2* | 7/2014 | Pineau | B60C 11/0302 |
| | | | | 152/209.28 |
| 9,336,435 | B1* | 5/2016 | Ozog | G06K 9/00288 |
| 2012/0207340 | A1 | 8/2012 | Bulan et al. | |

FOREIGN PATENT DOCUMENTS

| | | |
|---|---|---|
| DE | 10 2012 208177 A1 | 11/2013 |
| JP | 2012225795 A | 11/2012 |
| WO | 96/10727 A1 | 4/1996 |

* cited by examiner

METHOD AND DEVICE FOR CHECKING THE TIRE MOUNTING ON A VEHICLE

FIELD OF THE INVENTION

The present invention relates to a method and a device for checking the mounting of tires on a vehicle, in particular for examining whether the tires are mounted on the vehicle in the correct direction of rotation.

BACKGROUND INFORMATION

The direction of rotation is an important parameter in the mounting of tires on a vehicle, in particular on a motor vehicle. Although trained mechanics typically mount tires on vehicles, there is a risk of errors thereby occurring that increase the noise generated and/or reduce service life.

There is, therefore, a need for a method and a device that will make it possible to check the mounting of tires on a vehicle, in particular in what is commonly known as the "aftermarket," to rapidly and reliably detect an incorrect mounting of the tires.

German Patent Application DE 10 2014 205 515 A1 discusses a method and a device for optically inspecting the tread pattern of a vehicle wheel, in particular, for checking if the tread pattern is suited for wintry road conditions.

SUMMARY OF THE INVENTION

A method according to the present invention for checking the mounting of tires on a vehicle includes recording images of at least two tires mounted on the vehicle, the images each capturing at least one area of a tire, and comparing the recorded images to one another and/or to stored reference images to determine whether the tires are correctly mounted on the vehicle.

A device according to the present invention for checking the mounting of tires on a vehicle includes at least one image recording device that is configured for recording images of at least two tires mounted on the vehicle, the images each capturing at least one area of a tire that, in particular, includes the tire's tread, and an evaluation device configured for analyzing the recorded images to determine whether the tires are correctly mounted on the vehicle.

For that purpose, the evaluation device may, in particular, feature a storage device for storing images that each capture a tire area, and a comparator adapted for comparing at least one of the images recorded by the image recording device to images stored in the storage device.

Comparing the images of at least two tires mounted on the vehicle makes it possible to reliably and rapidly check whether the tires are correctly mounted on the vehicle, in particular in the correct direction of rotation, methods being used, in particular, for the automatic, in particular computer-aided image processing. It is thereby possible to rapidly and reliably detect mounting errors, especially errors where a tire is mounted with a different direction of rotation or with a direction of rotation other than that specified by the tire manufacturer.

One specific embodiment provides that the recorded images include, in particular, images of at least one area of the tire tread. On the basis of images of the tread, in particular of a tire's tread pattern, the direction of rotation of the tire may be rapidly and reliably ascertained and the mounting thereof checked with certainty.

One specific embodiment provides that the method include determining whether the tread has a directional pattern that predetermines the direction of rotation in which the tire is to be mounted on the vehicle. It is thereby also possible to check whether tires having a directional pattern are correctly mounted on the vehicle, i.e., in the correct direction of rotation.

For this purpose, it is particularly advantageous that tread pattern images be compared to a database in which a multiplicity of images of tire tread patterns are stored. Storing the image of an examined tire pattern in the database makes it possible to uniquely identify the pattern and retrieve the correct direction of the tire's rotation from the database.

One specific embodiment provides that, in particular, the method include images from tires that are mounted on a shared axle of the vehicle in order to determine whether the tires are correctly mounted on the vehicle, in particular with the same direction of rotation. It is thereby possible to reliably check whether the wheels, respectively tires are correctly mounted on a shared axle of the vehicle.

One specific embodiment provides that the method include recording images from all, in particular four or six tires that are mounted on the vehicle and comparing them to determine whether all tires of the vehicle are correctly mounted on the vehicle, in particular with the same direction of rotation.

A device according to the present invention may feature a plurality of image recording devices, in particular one for each tire of the vehicle, making it possible for images of all tires of the motor vehicle to be simultaneously recorded. In particular, the device may feature two image recording devices, one on each side of the vehicle, making it possible to simultaneously record images of all of the tires that are mounted on a shared axle of the vehicle. By using a plurality of image recording devices, the method according to the present invention makes it possible to very rapidly check the mounting of the tires on a vehicle.

A device according to the present invention may feature one or a plurality of illumination devices that light the area of the tires to be recorded by at least one image recording device, making it possible to record images with excellent image quality independently of the ambient light.

The image recording and/or illumination devices may be installed underneath the plane of the roadway, in particular in a drive-over channel, allowing the vehicle to drive over the same and, during the drive-over, for the at least one image recording device to record images of the tire contact area on at least one drive-over channel cover that is transparent and/or configured with at least one opening.

Exemplary embodiments of the present invention are described below with reference to the accompanying drawings.

DETAILED DESCRIPTION

Figure 1:
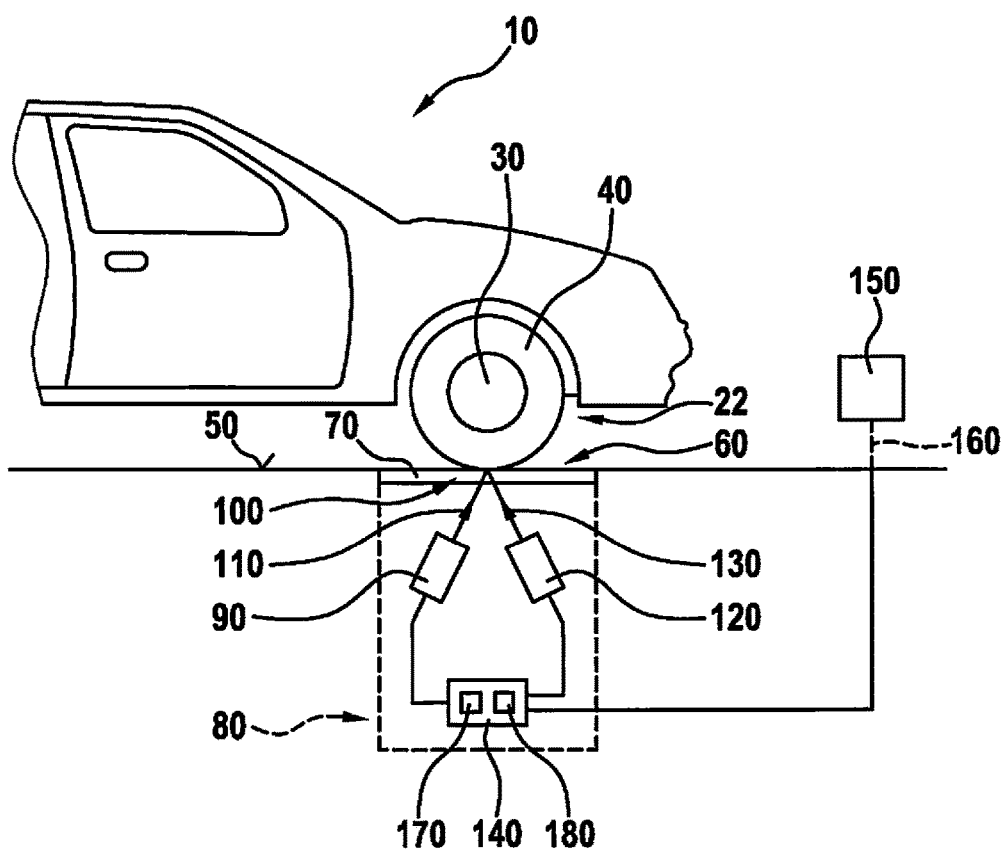
FIG. 1 shows a first exemplary embodiment of a device according to the present invention.

FIG. 1 shows a schematic side view of an only partially depicted motor vehicle 10, which includes a front wheel 22 that has a wheel rim 30 and a tire 40 that is positioned over an opening 60 configured in a road surface 50. In the example shown in FIG. 1, a cover plate 70, which is part of a drive-over channel 80 shown as a dashed line and inset in roadway 50, seals opening 60 in road surface 50. To facilitate understanding, drive-over channel 80 is shown in an enlarged view relative to vehicle 10 in schematic FIG. 1. In reality, it may also have significantly smaller dimensions. It is also not necessary that cover plate 70 be of the size shown in FIG. 1. It may also be smaller.

Located in drive-over channel 80 is an illumination device 90, which, in operation, transmits electromagnetic radiation toward contact area 100 of tire 40 on cover plate 70. The electromagnetic radiation, which is symbolized in FIG. 1 by an arrow 110, does not need to be coherent and may reside within the frequency, respectively wavelength thereof in the infrared region, the ultraviolet region and/or the optically visible region. Cover plate 70 is made of a material that allows the electromagnetic radiation transmitted by illumination device 90 to pass through, essentially unaltered.

An image recording device 120 is also configured in drive-over channel 80 in a way that allows it to receive electromagnetic radiation in order to record an image of tire contact area 100. This electromagnetic radiation is reflected off of tire contact area 100 and is symbolized by an arrow 130 in FIG. 1. Depending on the radiation received by image recording device 120, one, respectively a plurality of signals are transmitted by image recording device 120 to a data processing device 140, also configured within drive-over channel 80, and is/are processed by the same. It is self-evident that data processing device 140 may also be located outside of drive-over channel 80.

A signal processing result obtained by data processing device 140 is transmitted to an output device 150 that, in the example illustrated in FIG. 1, is located above roadway plane 50 in front of vehicle 10. The result may also be transmitted wirelessly, as indicated by dashed line 160, by a transmitter/receiver combination (not shown in FIG. 1) to output device 150. The result of the signal processing may also be transmitted to an output device 150 that is configured within vehicle 10, allowing the driver of vehicle 10 to be immediately aware of the information.

Data processing device 140 not only processes the signals supplied by image recording device 120, but also controls the interaction of illuminating device 90, of image recording device 120 and of output device 150. At least two of illuminating device 90, image recording device 120, and data processing device 140 may also be integrally configured in a shared device. They are shown separately in the illustrated example to facilitate understanding of the functioning method of the illustrated exemplary embodiment of the present invention.

Figure 2:
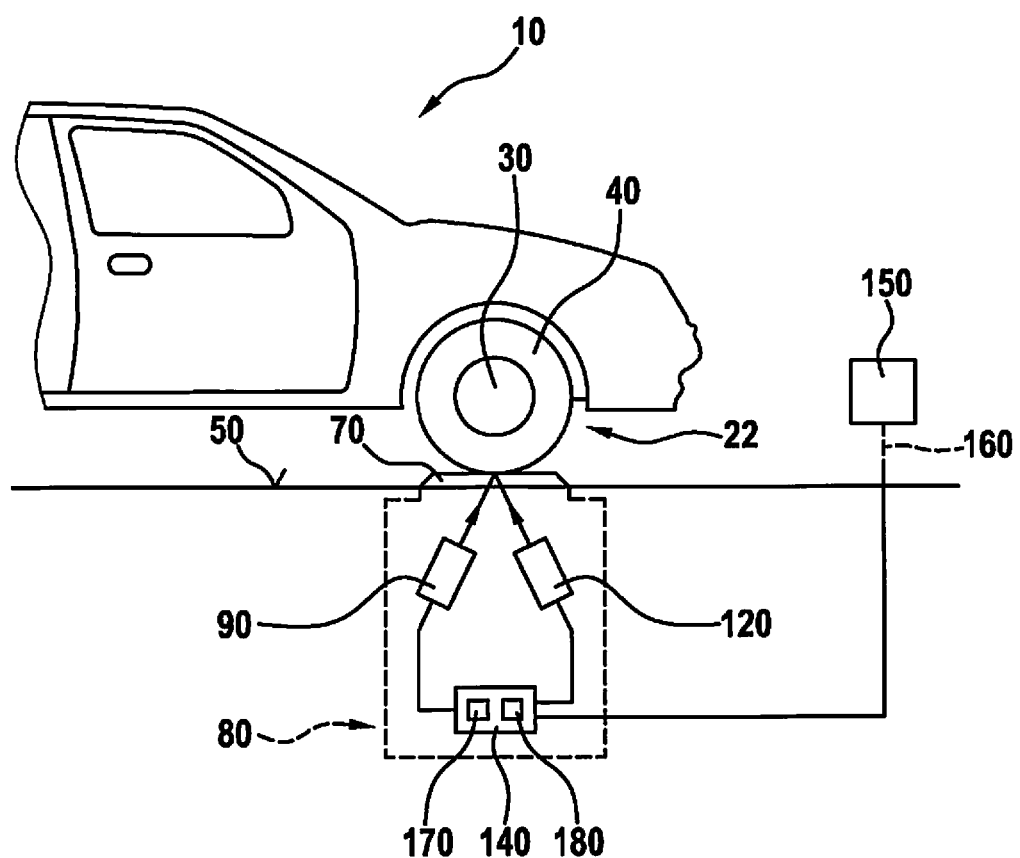
FIG. 2 shows a second exemplary embodiment of a device according to the present invention.

FIG. 2 shows a second exemplary embodiment of a device according to the present invention that differs from that shown in FIG. 1 in that cover plate 70 is configured in the form of a threshold on road surface 50 over which vehicle 10 may drive at a reduced speed. Cover plate 70 may be no greater than 70 mm in height. Due to the height of cover plate 70 in this exemplary embodiment, the driver of vehicle 10 notices that he/she is driving over a threshold and reduces the driving speed accordingly. A decreased driving speed enhances the quality of the image acquisition since any motional unsharpness is reduced.

To evaluate the images recorded by image recording device 120, data processing device 140 may have a comparator 170 that is adapted for mutually comparing the images of at least two tires 40 of vehicle 10, in particular the images of tires 40 that are mounted on a common axle of vehicle 10, in order to ascertain whether the at least two tires 40 are mounted on vehicle 10 in the same direction of rotation.

Data processing device 140 may also have a storage device 180 that allows comparator 170 to compare the images recorded by image recording device 120 to tire tread images stored in storage device 180, in order to uniquely identify the tire tread and, in particular, to determine the direction of rotation predetermined for tire 40, respectively for the tread thereof. If the direction of rotation predetermined for a tire 40 deviates from the actual direction of rotation of tire 40 mounted on vehicle 10, an error message to this effect is transmitted to output device 150, warning the driver of vehicle 10, respectively a mechanic performing the inspection, and prompting him/her to initiate a correct mounting of tire 40.

Figure 3:
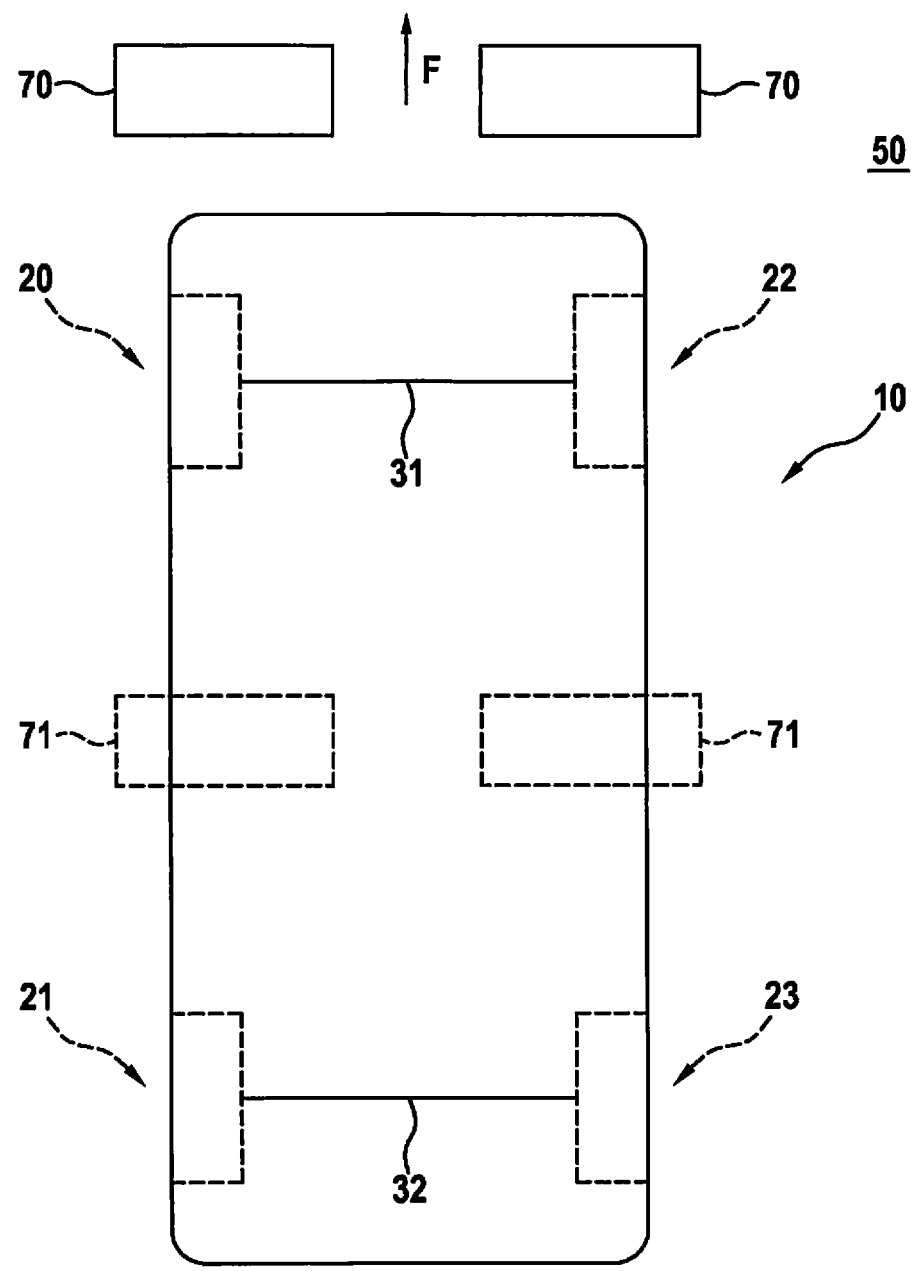
FIG. 3 shows a plan view of a schematically illustrated vehicle upon the driving over a device according to the present invention.

FIG. 3 shows a plan view of a schematically illustrated vehicle 10 having front wheels 20, 22 mounted on a front axle 31 and rear wheels 21, 23, mounted on a rear axle 32, it being provided that vehicle 10 moves in the direction of arrow F. Also depicted in or on road surface 50 are two cover plates 70 that may be configured in accordance with the specific embodiments shown in FIGS. 1 and 2. Not shown are illumination devices 90, image recording devices 120, respectively data processing devices 140 that are each located underneath cover plates 70.

The design illustrated in FIG. 3 permits simultaneous inspection of the tread pattern of both front wheels 20, 22 upon vehicle 10 driving over cover plates 70. Discernible here is that cover plates 70 are positioned to also allow inspection of rear wheels 21, 23, following inspection of front wheels 20, 22, upon moving of vehicle 10 in driving direction F.

Cover plates 71, shown by a dashed line, may also optionally include subjacent illumination devices 90, image recording devices 120, and data processing devices 140 (not shown in FIG. 3), thereby allowing images of the treads of rear wheels 21, 23 to be recorded at the same time as images of the treads of front wheels 20, 22. For the sake of clarity, FIG. 3 omits an illustration of a corresponding output device 150.

Transversely to moving direction F of vehicle 10, cover plates 70, respectively 71 have a width of at least 700 mm, subjacent illuminating devices 90 and image recording devices 120 being configured to allow the entire width of cover plates 70, 71 to be used for inspecting the treads of tires 40, 41, 42, 43. A detection width of at least 700 mm ensures that tires 40, 41, 42, 43 of as many as possible vehicle classes, from subcompact cars to lightweight trucks, be able to be measured.

To ensure that all tires 40, 41, 42, 43 on all vehicles 10 to be inspected be able to be measured, guide devices (not shown in FIG. 3) may be provided that are adapted to ensure that all vehicles 10 drive over cover plates 70, 71, respectively over subjacent image recording devices 120.

Once image recording devices 120 disposed underneath cover plates 70, 71 have recorded the images of the treads of tires 40, 41, 42, 43, at least one data processing device 140 compares them to check whether tires 40, 41, 42, 43 have been correctly mounted on vehicle 10.

To that end, a plurality of data processing devices 140 may be interconnected wirelessly or by wire, to enable them to mutually compare the images of tires 40 that are mounted on various wheels 20, 21, 22, 24 of vehicle 10. Alternatively, a central data processing device 140 may also be provided that is connected wirelessly or by wire to all image recording devices 120 to analyze the images recorded by image recording devices 120 and, in particular, to compare them to one another and/or to reference images stored in storage device 180.

Figure 4A:
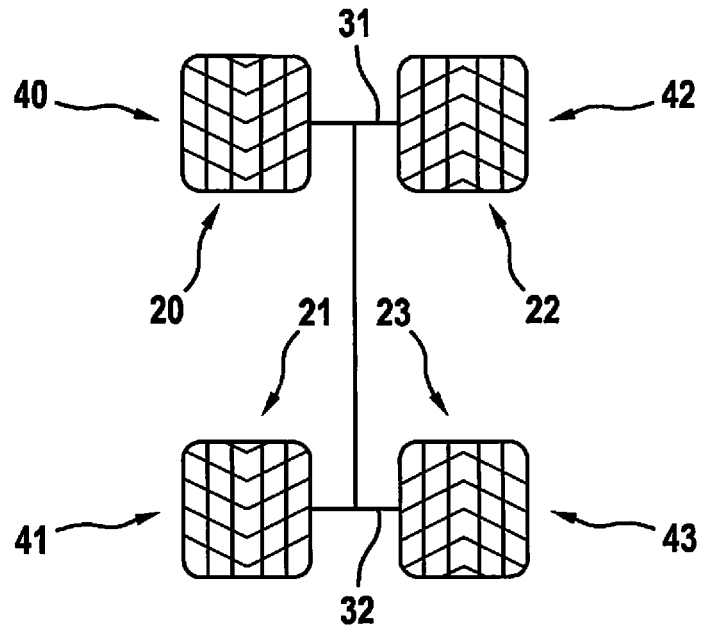
FIGS. 4a, 4b, and 4c schematically show examples of images of the treads of tires mounted on the vehicle.
Figure 4B:
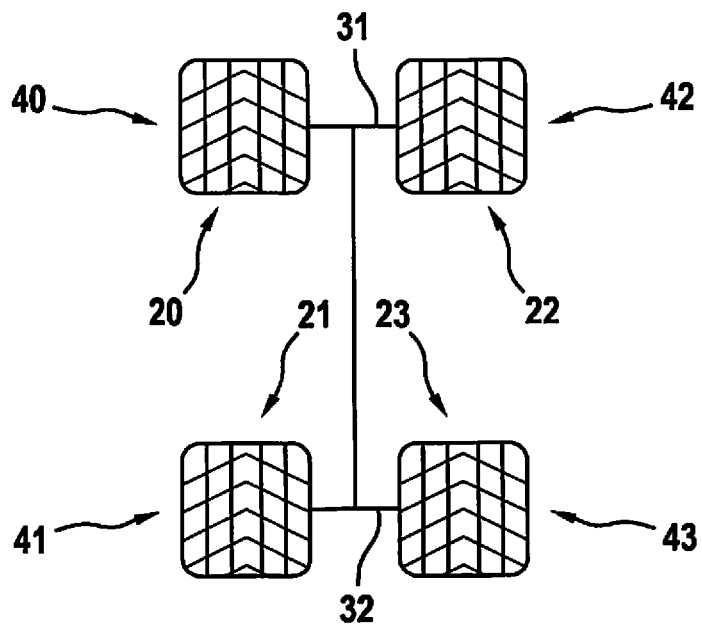
Figure 4C:
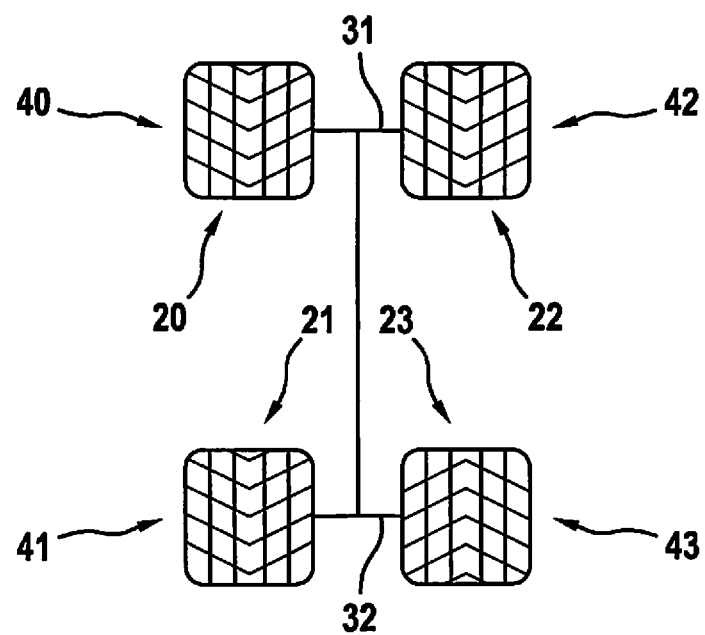

FIG. 4*a* through 4*c* schematically show three examples of images of the treads of tires 40, 41, 42, 43 mounted on vehicle 10, as recorded by an image recording device 120.

Tires 40, 41, 42, 43 shown in FIG. 4*a* have a directionally independent tread pattern, i.e., the tread pattern of tires 40, 41, 42, 43 does not predetermine any preferred direction of rotation of tire 40, 41, 42, 43. In FIG. 4*a*, tires 40, 41, 42, 43 are mounted in the same way on all wheels 21, 22, 23, 24 in relation to respective axle 31, 32, so that there are no mounting errors.

The case shown in FIG. 4*a* would be assessed differently if the tread pattern of tires 40, 41, 42, 43 were directional, i.e., if the tread pattern predetermined a preferred direction of rotation for tire 40, 41, 42, 43. Since, in the example shown in FIG. 4*a*, tires 40, 41 on the left side of vehicle 10 have a different direction of rotation relative to road surface 50 than tires 42, 43 that are mounted on the right side of vehicle 10, there would be an error here that would result in an error message to this effect being output.

Thus, tires 40, 41, 42, 43 having a directional pattern must be mounted as shown in FIG. 4*b*, to ensure that they all have the same direction of rotation relative to road surface 50, as predetermined by the tire tread.

The tire configuration shown in FIG. 4*c* has a mounting error, both in the case of a directionally independent pattern, as well as in the case of a directional pattern.

In the case of tires 40, 41, 42, 43 having a directionally independent pattern, as shown in FIG. 4*a*, right front wheel 22 is mounted in the incorrect orientation, as is apparent from a comparison of the tire treads shown in FIGS. 4*a* and 4*c*.

On the other hand, in the case of tires 40, 41, 42, 43 having a directional pattern, as shown in FIG. 4*b*, right rear wheel 23 is mounted in the incorrect orientation, as is immediately derived from a comparison of the tire treads shown in FIGS. 4*b* and 4*c*.

Therefore, the present invention makes it possible to rapidly and reliably discern that tires 40, 41, 42, 43 have been incorrectly mounted, in particular mounted in an incorrect direction of rotation on a vehicle 10, and to avoid the disadvantages associated with such an incorrect mounting with regard to the driving properties of vehicle 10 and the durability of tires 40, 41, 42, 43.

What is claimed is:

1. A method for checking a mounting of tires on a vehicle, the method comprising:
    recording images of at least two tires mounted on the vehicle, the images each capturing at least one area of a tire, the images including at least one area of a tread of the tire, wherein the tread has a directional pattern;
    comparing the recorded images and determining whether the tires have been correctly mounted on the vehicle; and
    determining whether the tread is mounted on the vehicle in a direction of rotation predetermined by a directional pattern.

2. The method of claim 1, further comprising:
    comparing at least one image of the tread pattern of a tire to images of tread patterns stored in a database.

3. The method of claim 1, further comprising:
    determining whether the tires are all mounted in the same direction of rotation on the vehicle.

4. The method of claim 1, further comprising:
    recording images from tires that are mounted on a shared axle of the vehicle and of comparing them to determine whether the tires are correctly mounted on the shared axle, in the same direction of rotation.

5. The method of claim 1, further comprising:
    recording images from at least four or six tires that are mounted on the vehicle to determine whether the tires are all correctly mounted on the vehicle.

6. A device for checking a mounting of tires on a vehicle, comprising:
    at least one image recording device to record images of at least two tires that are mounted on the vehicle, the images each capturing at least one area of a tire; and
    at least one data processing device to analyze the recorded images to determine whether the tires are correctly mounted on the vehicle;
    a storage device in which images, which each capture at least one area of a tire, are stored, wherein the images include at least one area of a tread of the tire, wherein the tread has a directional pattern; and
    a comparator configured to compare at least one of the images recorded by the image recording device to images stored in the storage device; and
    a determining device configured to determine whether the tread is mounted on the vehicle in a direction of rotation predetermined by a directional pattern.

\* \* \* \* \*